UNITED STATES PATENT OFFICE.

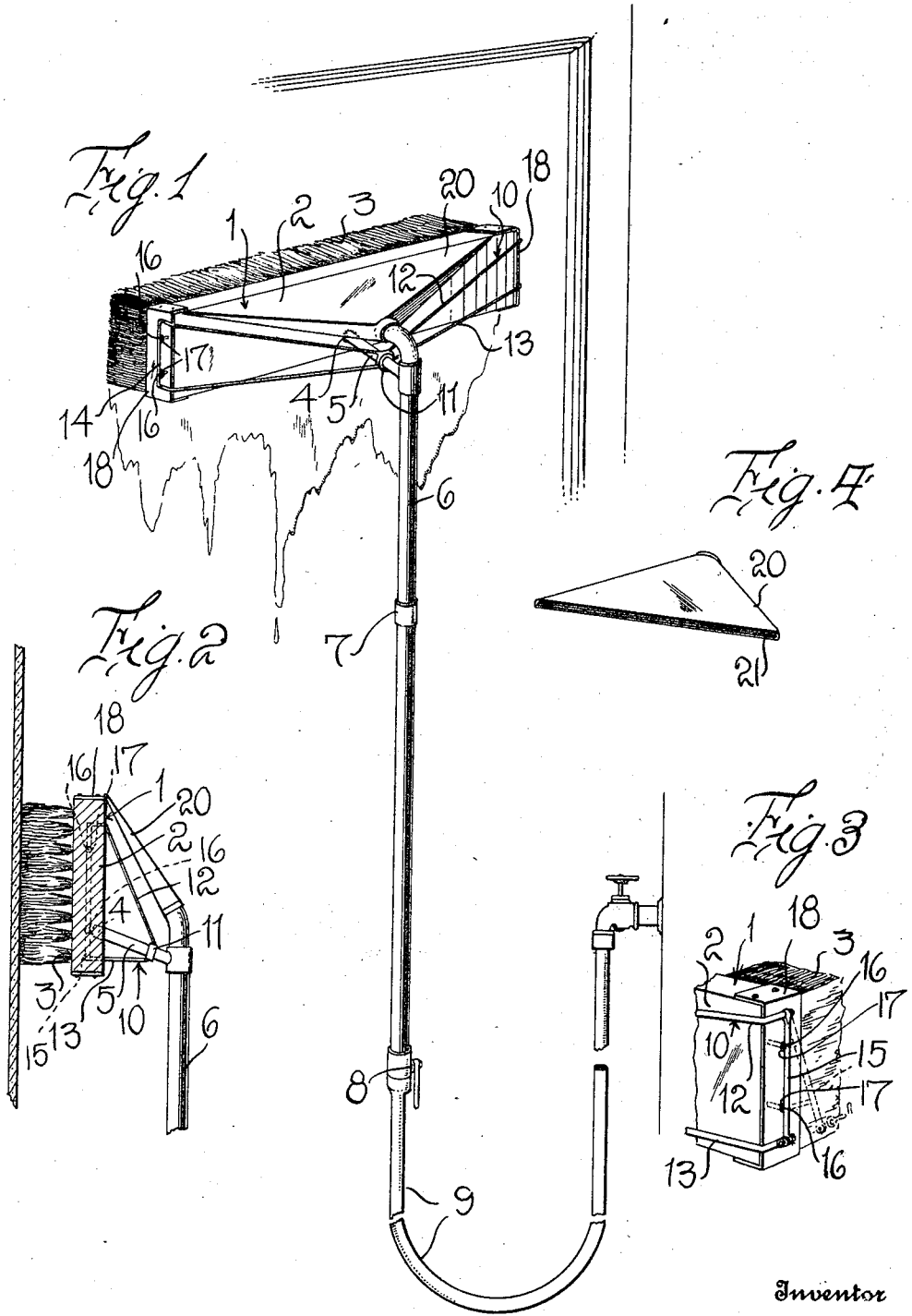

IRA P. ARMSTRONG, OF LOCK HAVEN, PENNSYLVANIA.

BRUSHING APPARATUS.

1,218,040.     Specification of Letters Patent.     Patented Mar. 6, 1917.

Application filed November 4, 1916. Serial No. 129,594.

*To all whom it may concern:*

Be it known that I, IRA P. ARMSTRONG, a citizen of the United States, residing at Lock Haven, in the county of Clinton and State of Pennsylvania, have invented certain new and useful Improvements in Brushing Apparatus, of which the following is a specification, reference being had to the accompanying drawings.

This invention comprehends certain new and useful improvements in brushes and scrubbing devices, and relates particularly to an improved fountain brush designed to do away with the necessity of using a bucket or pail in cleaning windows, wood and tile floors, walls and the like, the invention having for its primary object a practical, durable and efficient construction of device of this character, the parts of which may be easily constructed and readily assembled and not liable to get out of order.

A further object of the invention is a brush of this type embodying a tubular handle through which the water is adapted to flow, means for readily attaching any desired brush of a set to the handle, and a water distributing device or member readily attachable to the forward end of the handle whereby a film of water may be sprayed upon the glass or the like during or after the washing and brushing operation.

And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a perspective view showing my brush in applied position,

Fig. 2 is a sectional view through the brush,

Fig. 3 is a fragmentary perspective view of one end of the brush, and

Fig. 4 is a detail perspective view of the fan-shaped water distributer employed.

Corresponding and like parts are referred to in the following description and designated in all of the views of the accompanying drawing by like reference characters.

Referring to the drawing, the numeral 1 designates a brush of which there are preferably three for the complete set, 2 designates the preferably wooden or metallic back of the brush, and 3 the bristles thereof. The back 2 is formed with a socket 4, to detachably receive the preferably solid stem 5 which projects laterally and preferably obliquely from the forward end of the tubular handle 6. The handle 6 is preferably constructed in two or more sections joined together detachably by a threaded union or unions 7, and is provided at its rear end with a valve 8 whereby the flow of water therethrough may be easily controlled by the operator. The handle is intended to be attached to a flexible hose or conduit 9 and the latter in turn connected to a spigot or other source of supply.

10 designates a frame. This preferably embodies a ring 11 which is designed to extend around the forward end of the handle close to but spaced from the brush, in order to strengthen and hold the frame rigid, said frame also embodying a front transversely extending side bar 12 which is preferably bowed, or of angular formation, as shown, and connected intermediate of its ends to the ring 11, and a rear and preferably straight side bar 13 which is also connected midway of its length to said ring. A relatively stationary cross-bar 14 is connected to the side bars 12 and 13 at corresponding ends of the latter, and a hinged cross-bar 15 is connected to the other ends of said bars, said cross bars being formed with pins 16 that are designed to enter openings 17 formed in end binding straps 18 that are secured by tacks or similar fastening devices so as to extend along the ends of the brush back 2 as clearly illustrated in the drawing. It will be thus understood that the frame may be readily connected in a detachable manner to the brush by having the pins entered into the openings 17 and the hinged cross-bar 15 closed and locked in any desired manner.

The forward or discharge end of the tubular handle 6 is preferably turned slightly, as shown, and is designed for detachable connection, as illustrated, to a fan-shaped water distributing member 20 which is formed at its discharge end with a transversely elongated and relatively narrow slot 21 extending the full length of the brush back 2 so as to discharge a film of water over the brush or upon the window glass or the like being washed.

From the foregoing description, in connection with the accompanying drawing, the operation of my improved washing device or appliance will be apparent. For example, in washing windows, the requisite amount of water is turned on and the brush is rubbed up and down the window, as any other window brush. After the rubbing operation has been completed as desired, the operator draws the brush away from the window allowing the thin sheet or film of water to rinse the window off, whereby all splashing is prevented and waste of water obviated, as is the case where the window or the like is washed by the old method of employing a hose or bucket or pail.

While the accompanying drawing illustrates what I believe to be the preferred embodiment of my invention, it is to be understood that the invention is not limited thereto, but that various changes may be made in the construction, arrangements and proportions of the parts without departing from the scope of the invention as claimed.

What is claimed is:

1. A device of the character described, comprising a brush, the back of which is provided with a socket, a handle having at its forward end a laterally extending stem adapted to be secured in said socket, a frame connected to the said stem, and embodying front and rear side bars, a relatively stationary cross bar, a hinged cross bar, each of said cross bars being formed with pins, and end binding strips secured to the back and formed with openings in which the pins are adapted to be inserted whereby the frame is detachably connected to the back of the brush.

2. A device of the character described, comprising a handle provided at its forward end with a laterally extending stem, a brush, the back of which is formed with a socket engageable with said stem, a frame embodying front and rear side bars and cross bars, one of said cross bars being secured in fixed relation to corresponding ends of the front and rear side bars and the other cross bar having a hinged connection with the other end of one of said side bars and adapted to be secured to the corresponding end of the other side bar, said cross bars being formed with pins, and end binding strips secured to the back of the brush and formed with openings designed to receive said pins, said frame also embodying a ring to which the front and rear side bars are connected intermediate of their ends, the ring being adapted to be slipped over and upon the stem.

3. A device of the character described comprising a brush, a frame detachably connected therewith and embodying a ring, a handle detachably engaged with the brush, and a stem extending from the handle and insertible through the ring of the frame, the brush being provided with a socket to receive said stem.

In testimony whereof I hereunto affix my signature in the presence of two witnesses.

IRA P. ARMSTRONG.

Witnesses:
MYRTLE D. ACHUFF,
SARA I. PASSELL.